Nov. 22, 1966   C. E. LYALL   3,286,839
BRINE SAVER DEVICE
Filed July 16, 1962   2 Sheets-Sheet 2
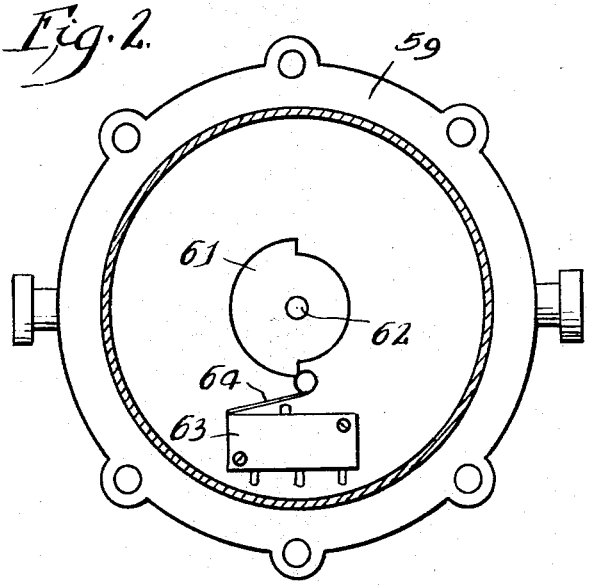
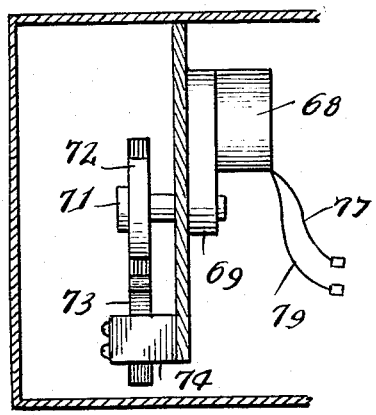
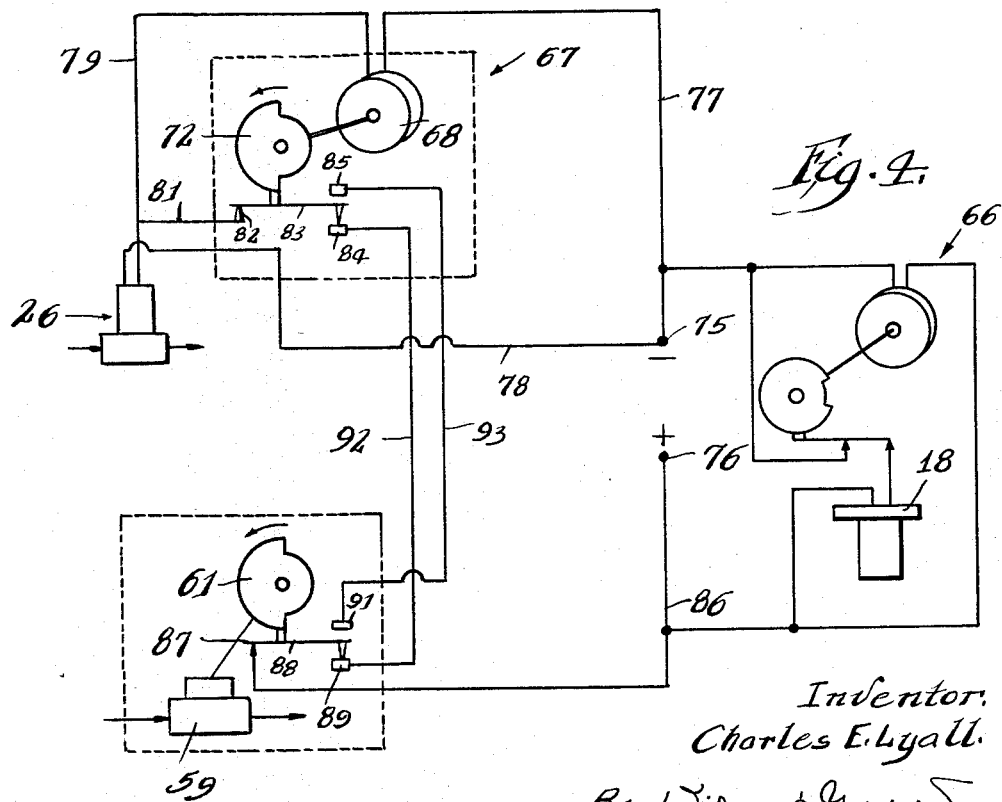
Inventor:
Charles E. Lyall.
By Wilson & Geppert
Attorneys.

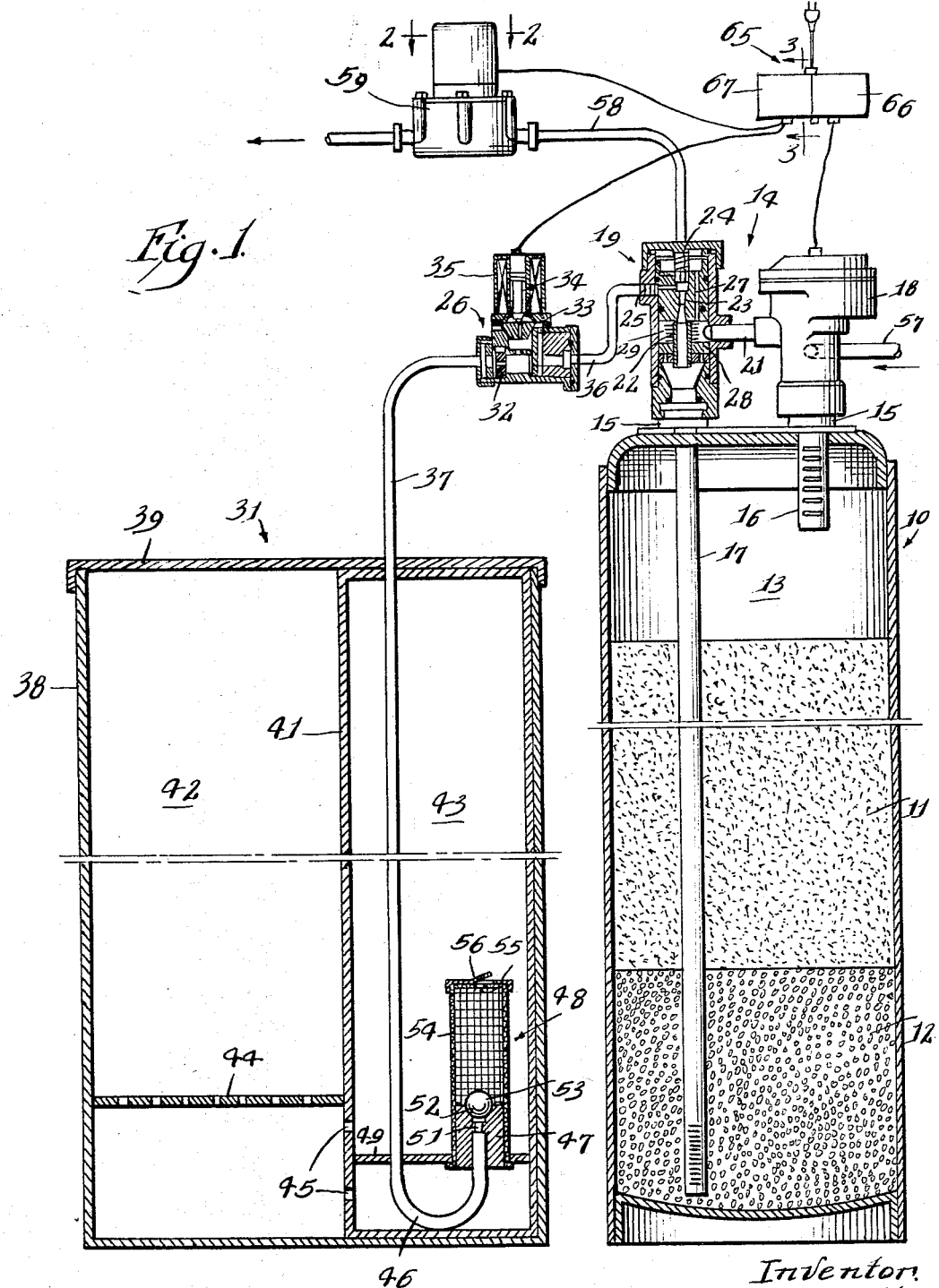

United States Patent Office 3,286,839
Patented Nov. 22, 1966

3,286,839
BRINE SAVER DEVICE
Charles E. Lyall, Deerfield, Ill., assignor to Culligan, Inc., Northbrook, Ill., a corporation of Delaware
Filed July 16, 1962, Ser. No. 210,121
5 Claims. (Cl. 210—101)

The present invention relates to a novel control assembly for an automatic water softener having a separate brine storage tank to rejuvenate the water softening or conditioning material and more particularly to a brine saver device which will provide an optimum quantity of brine for regeneration or rejuvenation of the water softening material based upon the quantity of liquid passing through the softener during the water conditioning cycle.

One of the prevalent problems associated with a single tank fully-automatic water softener or conditioner regenerated on a periodic or calendar basis is the wastage of brine utilized in the regeneration cycle, especially in commercial or industrial operations, where there is a fluctuation in the water passing through the tank in a softening cycle and, therefore, fluctuation in the exhaustion of the ion exchange mineral. Regeneration on a calendar basis refers to an automatic unit where regeneration occurs every twenty-four hours or forty-eight hours or other constant or predetermined interval of time.

As an example of the brine wastage, if a softener was sent to regenerate every twenty-four hours and the maximum water usage for this time period was established at two-thousand gallons, then, based on the size of the softener and influent water hardness, a fixed amount of brine would be required to regenerate the softener. In this example, it is assumed that seventeen gallons of 95° salometer brine (approximately forty-two pounds of salt) would be required for a regeneration of the water softening material under maximum conditions. Now, due to fluctuations in water usage, there could be days when only four-hundred gallons of water were consumed, but because of the original setting of seventeen gallons of brine per regeneration cycle, approximately fourteen gallons more brine is utilized than is necessary to the decreased quantity of water consumed from the softener.

The present invention obviates this problem of brine wastage by proportioning the amount of brine provided for a regeneration cycle to the quantity of water used from the softener during a softening cycle.

An important object of the present invention is the provision of a novel control assembly to regulate the amount of brine to be delivered to a water softener in a regeneration cycle based on the quantity of water passing through the softener during the service cycle so as to prevent wastage of brine.

Another important object of the present invention is the provision of a novel control assembly which is so constructed that a proper amount of regenerating material for regeneration of a water softener is always available regardless of the basis used to determine the intervals between regeneration cycles.

A further object of the present invention is the provision of a novel assembly which will feed water to the brine tank in intermittent controlled quantities based on predetermined quantities of water passing through the softener.

The present invention further comprehends the provision of a novel control system having a positive displacement metering device actuating a cam means for actuating an intermittently operating circuit including a single cam timer of a predetermined revolution per minute and a solenoid valve in the line communicating between the brine storage tank and the automatic water softener. The single cam timer provides intermittent actuation of the solenoid valve.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view, part in front elevation and part in vertical cross section, of an automatic water conditioning system embodying the present novel automatic brine saver device shown in front elevation above the service tank for the automatic control of liquid being fed to the brine storage tank.

FIG. 2 is an enlarged horizontal cross-sectional view taken on the line 2—2 of FIG. 1 and viewed in the direction of the arrows.

FIG. 3 is an enlarged vertical cross-sectional view taken on the line 3—3 of FIG. 1 and showing the timer mechanism for the brine solenoid valve.

FIG. 4 is a schematic showing of the water meter and brine solenoid valve connected to the water saver timer and the circuitry utilized for control of the brine saver device.

Referring more particularly to the disclosure in the drawings in which is shown an illustrative embodiment of the present invention, FIG. 1 discloses a tank 10 such as used in industrial or home softeners containing a loose and relatively deep bed of ion exchange mineral 11 disposed upon and above a gravel or filter bed 12 in the bottom of the tank and extending to the desired level or height but shown as spaced a suitable distance below the top of the tank to provide a free board space 13 thereabove.

An automatic valve mechanism generally designated by the reference character 14 is secured to the tank 10 by suitable fittings 15, one of which is connected to a readily removable inlet manifold 16 and the other to a depending outlet manifold 17. While regeneration is automatically effected in commercial or home operations, the softener tank is shown as being readily disconnected from the automatic valve 14 and bodily removed when necessary for regeneration or removal of the mineral 11 or other treating procedures.

The automatic valve mechanism 14 utilized to control the regeneration of the tank 10 may be of a suitable design such as shown in the Schulze et al. Patent No. 3,006,376, issued October 31, 1961. This valve includes a directional valve unit 18 and a separate eductor unit 19, the two units being connected by a short by-pass conduit 21. The eductor unit shown includes a central tubular member 22 having a throat or constriction at 23 for eduction. The upper end of the central member contains a flow control 24 and a side opening or passage 25 communicating with a brine solenoid valve 26 located between the flow control 24 and the throat 23. The conduit 21 communicates with the flow control 24 through a passage 27 and a spring-loaded check valve 28 allows flow from the outlet manifold 17 into the central chamber 29 but does not allow flow in the opposite direction so that the only downward flow from the eductor unit 19 must be through the central tubular member 22.

The brine solenoid valve 26 is preferably but not necessarily of the type disclosed in the Mahlstedt et al. application Serial No. 136,556, filed September 7, 1961, where flow to a brine tank 31 is restricted by a reciprocal flexible flow control 32 and flow in the opposite direction to the eductor unit 19 is relatively unrestricted due to an axially vaned spider surrounding the sides and one end of the flow control 32. A diaphragm 33 actuated by a valve stem 34 controls flow to the brine tank 31 through a solenoid 35. The solenoid valve communicates with the eductor through conduit 36 and with the brine tank 31 through conduit 37.

The brine tank 31 has a generally cylindrical container 38 with a cover 39 and an inner partition or cylinder 41 dividing the tank into a salt storage chamber 42 and a brine storage chamber 43. A horizontal perforated plate 44 extends across the salt storage chamber 42 and is spaced from the floor of the tank; the salt utilized for the brine regenerant resting on the plate. One or more openings 45 below the plate 44 in the partition 41 provides communication between the chambers.

The end of conduit 37 terminates in a U-bend portion 46 and a resilient base 47 of the air eliminator valve 48 mounted in the plate 49 receives the upturned end of the conduit in a central passage 51. A valve seat 52 is formed in the upper end of the passage 51 for the ball valve 53. A cylindrical cage or screen 54 closed at one end fits over the base 47 to limit movement of the buoyant ball valve 53. The closed end of the cage 54 has a central opening 55 smaller in diameter than the diameter of the ball valve to allow escape of any air entrapped in the cage, and a flap check valve 56 covers the end of the cage and the opening 55.

Hard untreated water enters the valve unit 18 through a conduit 57 and soft or treated water emerges from the eductor 19 through the conduit 58 to service in the home or other installation. A positive displacement water metering device 59 of any preferable design is shown as a wobble plate displacement type and is positioned in the line 58 to meter the treated water drawn through the tank 10. Such meters are commonly used in homes and industry and an illustrative example is shown in the Abrams Patent No. 2,493,098, issued January 3, 1950. The wobble plate causes circular rotative movement of a shaft extending upward therefrom, which shaft causes rotation of a gear train connected to a takeoff shaft. Instead of an indicating dial on the meter, a cam 61 is mounted on the take-off shaft or spindle 62 (FIG. 2). A switch 63 having a follower arm 64 bearing against the cam is a single pole double-throw switch as seen in FIG 4.

A timer member 65 contains a regeneration timer 66 connected to a solenoid in the valve 18 to initiate a regeneration at regular intervals of time such as every twenty-four hours. A brine saver timer 67 is also housed in the member 65 and as seen in FIG 3 includes the timer motor 68 connected to suitable gearing in housing 69 with a driven shaft 71 having a cam 72 secured thereon. This cam coacts with the follower arm 73 of a single pole double-throw switch 74. This switch is connected to the solenoid 35 of the brine solenoid valve 26.

Referring now to FIG. 4, a wiring circuit is shown for the cooperation of the water meter and the brine solenoid valve and includes a source of electricity as shown at the junctions 75 and 76. A line 77 leads from junction 75 to the timer motor 68 and line 78 leads to the brine solenoid valve 26. The line 79 communicates between the brine solenoid valve and the timer motor 68 and has a branch line 81 leading to the contact 82 of the switch 74. The switch arm 83 will engage either contact 84 or contact 85 depending on the position of the cam 72.

A line 86 leads from the junction 76 to the contact 87 of the switch arm 88. The arm engages either contact 89 or contact 91 depending on the position of cam 61. The line 92 connects contacts 84 and 89, and the line 93 connects contacts 85 and 91.

Considering the operation of the present invention, it is assumed that the softener 10 with known influent hard water conditions will deliver two-thousand gallons of soft water and at the end of this time will require regeneration. The regeneration cycle will require approximately forty-two pounds of salt or approximately seventeen gallons of 95° salometer brine. Using a flow control 32 of one-half gallon a minute in the valve 26, that valve must be energized for a total of thirty minutes to provide the fifteen gallons of water necessary to produce the brine. The water meter 59 is so geared that one-hundred gallons passing through it will provide a 180° revolution of the cam 61. The timer motor 68 is designed to provide a 180° revolution of the cam 72 in one and one-half minutes.

Beginning when the timer 66 has returned the valve 18 to service operation, hard water enters the valve 18 from the conduit 57, passes through the inlet manifold 16 and down through the ion exchange mineral 11 and the filtering bed 12 to the outlet manifold 17. The treated water passes up through the manifold into the eductor unit 19 past the check valve 28 to the main chamber 29 and thence to the conduit 58 and the water meter 59. Water also passes up through the central tubular member 22 and the conduit 36 to the brine solenoid valve 26 where the diaphragm 33 prevents liquid from entering the brine tank 31.

As the treated liquid passes through the water meter 59, the wobble plate assembly causes rotation of the take-off spindle 62 and the cam 61. This cam is designed to cause operation of the switch 63 at every 180° of revolution, although other suitably designed or variable gear ratios between the meter and the cam may be substituted to cause actuation of the switch 63 upon varying number of gallons passing through the meter. The particular cam to be used is determined upon the basis of the total capacities of the softener and the influent hardness.

Referring to the above example, FIG. 4 shows the positions of the cams 61 and 72 after one-hundred gallons of water have passed through the meter and the switch arm 88 has been moved to abut contact 89 through the agency of the follower arm 64. A circuit is then completed through 76–86–87–88–89–92–84–83–82–81–79–68–77 and 75 to energize the timer 67. Simultaneously, the solenoid 35 of the brine solenoid valve 26 is energized through the above circuit going from 79 to the valve 26 and then through 78 to 75. Flow is begun at one-half gallon per minute through the flow control 32 due to the lifting of the valve stem 34 and the attendant lifting of the diaphragm 33 as disclosed in the above mentioned Mahlstedt et al. application. The timer 67 rotates the cam 72 for an interval of one and one-half minutes, at which the cam 72 will have completed a 180° revolution and the follower 73 will fall off the high portion of the cam to move the switch arm 83 to engage the contact 85 thus opening the circuit to deenergize the timer 67 and the brine solenoid valve 26.

The cam 72 remains in its halted position until another one-hundred gallons have passed through the meter 59 causing the cam 61 to rotate 180°. Then the switch arm 88 is moved to engage the contact 91 through the movement of the follower 64 and a circuit is completed through 76–86–87–88–91–93–85–83–82–81–79–68–77 and 75 and the circuit to the brine solenoid valve is completed through 79–26–78 and 75. Then the timer 67 again operates for one and one-half minutes until the follower 64 shifts the switch arm 83 back to contact 84.

At the end of the twenty-four hour period, the regeneration timer 66 will actuate the directional valve unit 18 to cause influent water from conduit 57 to pass through the bypass conduit 21 and enter the central chamber 29 to be available to the outlet conduit 58 as required. The water passes through the passage 27, flow control 24, throat 23 and down through the tubular member 22 to enter the service tank 10 via the outlet manifold 17 and pass upwardly through the filter and mineral bed to drain. Brine from the tank 31 is drawn through the conduit 37 and the brine solenoid valve 26 to the side passage 25 to mix with the downward flow of water due to the vacuum created by the venturi throat 23. This suction also tends to lift the diaphragm 33 against the action of the valve stem 34 to allow relatively unrestricted flow of brine as more fully explained in the cited Mahlstedt et al.

application. When the brine level in the brine tank 31 reaches the height of the valve seat 52, the buoyant ball valve 53 seats on the valve seat to prevent air from entering the conduit 37. The water passing through the eductor 19 then acts to rinse any excess brine from the prefilter and mineral beds until the regeneration timer 66 again reverts to service flow.

Thus, the water fed to the brine tank for a regeneration cycle of the service tank is proportioned to the total quantity passing through the softener. Whether the maximum or a lesser quantity of water has passed through the softener tank at the time the regeneration cycle is initiated, the requisite amount of brine is available to regenerate the fully or partially exhausted ion exchange material.

While the brine saver device embodies a control valve, a brine solenoid valve and an air eliminator valve of a particular design by way of illustration, it is not my intent or desire to unnecessarily restrict the invention by virtue of this limited showing. For instance, the liquid level control valve disclosed in the Schulze et al. Patent No. 2,920,644, issued January 12, 1960, could be substituted for the air eliminator valve illustrated herein. It is also contemplated that specific descriptive terms employed herein be given the broadest possible interpretation consistent with the actual disclosure.

Having thus disclosed the invention, I claim:

1. In a water softening apparatus including a tank for water softening material, a hard water supply and a service line communicating with the tank, a regenerant tank, and a conduit communicating between said regenerant tank and said first mentioned tank, a brine saver device comprising means to meter the water in said service line emerging from the first mentioned tank, a solenoid valve located in said conduit, a timer connected to said solenoid valve having means to actuate the valve for predetermined intervals allowing flow of softened water to said regenerant tank, and switch means actuated by said metering means after a predetermined quantity of water has passed therethrough actuating said timer.

2. In a water softening apparatus including a softener tank containing water softening material, a brine tank, a hard water supply line and a service line communicating with said softener tank, and a conduit communicating between the brine tank and the softener tank, a brine saver device comprising positive displacement metering means in said service line to measure the quantity of water passing through said softener tank, a solenoid valve located in said conduit controlling flow of softened water to said brine tank, a timer connected with said solenoid valve having means to actuate said valve for predetermined time intervals allowing flow to said brine tank, a cam rotated by said metering means as water passes therethrough, and a switch actuated upon each 180° rotation of said cam to actuate said timer.

3. In a water softening apparatus including a softener tank for water softening material, a hard water supply line and a service line communicating with said tank, a brine tank and a conduit communicating between said brine tank and said softener tank, a brine saver device comprising a positive displacement water meter positioned in said service line, a cam in said meter and geared to the meter to rotate as water passes therethrough, a double-throw switch in said meter and actuated by said cam for each 180° revolution thereof, a solenoid valve located in said conduit, and a timer connected to said solenoid valve having means to actuate said valve for predetermined time intervals allowing flow to said brine tank, the valve actuating means in said timer including a timer motor, a second cam rotated by said timer motor and a second double-throw switch actuated by said second cam after each 180° revolution of said second cam.

4. In a water softening apparatus as set forth in claim 3, in which said double-throw switches are connected in parallel, and said solenoid valve and said timer are connected in parallel.

5. A brine saver device for utilization with an automatically controlled periodically regenerated water conditioning unit including a tank containing ion exchange material, a control valve for said tank, a hard water supply line and a service line communicating with said control valve, a brine tank adapted to supply regenerant to said valve, and a conduit communicating between said brine tank and said valve, the brine saver device comprising a positive displacement water meter positioned in said service line to measure the quantity of water treated by said tank, a first cam in said meter rotated thereby as water passes therethrough, a first single pole double-throw switch on said meter, a follower arm on the switch resting on said cam, a switch arm actuated by said follower arm, said cam being so contoured as to shift the follower every 180° of cam revolution, a timer motor, a second cam rotated by said timer motor, a second single pole double-throw switch having a follower cam actuated by said second cam every 180° of cam revolution, a second switch arm on the second switch actuated by its associated follower arm, a brine solenoid valve located in said conduit, a source of electric current, one line from said source communicating with the switch arm of said first switch, the other line from said source being connected in series with said timer motor, said brine solenoid valve and the switch arm of the second switch, a pair of contacts in each switch adapted to be alternately contacted by the switch arm of the switch, and a pair of lines connecting corresponding contacts of each switch, whereby the switches cooperate to intermittently actuate said brine solenoid valve to supply softened water to said brine tank.

References Cited by the Examiner
UNITED STATES PATENTS

| | | | |
|---|---|---|---|
| 1,725,110 | 8/1929 | Stickney | 210—190 X |
| 2,265,225 | 12/1941 | Clark | 210—139 X |
| 2,631,665 | 3/1953 | Perrin | 210—190 X |
| 2,689,218 | 9/1954 | Waugh | 210—89 |
| 2,751,347 | 6/1956 | Miller | 210—134 |
| 2,935,196 | 5/1960 | Miller | 210—134 X |
| 3,048,274 | 8/1962 | Lundeen | 210—101 |

REUBEN FRIEDMAN, *Primary Examiner.*

HERBERT L. MARTIN, *Examiner.*

F. W. MEDLEY, R. A. CATALPA, *Assistant Examiners.*